United States Patent [19]

Wicker, Jr.

[11] Patent Number: 4,490,864

[45] Date of Patent: Jan. 1, 1985

[54] SHELTER BED

[76] Inventor: Roy W. Wicker, Jr., P.O. Box 697, Seagraves, Tex. 79359

[21] Appl. No.: 466,045

[22] Filed: Feb. 14, 1983

[51] Int. Cl.³ ............... A47C 19/04; A47C 19/22; E02D 27/34

[52] U.S. Cl. ............................ 5/9 R; 5/2 R; 5/308; 52/167

[58] Field of Search ........... 5/308, 58, 8, 9 R, 9 B, 5/10 R, 2, 1; 411/72, 73, 172, 173, 176, 177, 178, 180, 181, 188, 455, 510; 52/705, 167

[56] References Cited

U.S. PATENT DOCUMENTS

| | | | |
|---|---|---|---|
| 730,585 | 6/1903 | Thiollier | 52/705 |
| 1,365,718 | 1/1921 | Ogden | 52/705 |
| 1,413,593 | 4/1922 | Kreuzkamp | 5/58 |
| 1,627,554 | 5/1927 | Fisher et al. | 52/705 |
| 1,859,912 | 5/1932 | Brooker | 5/308 |
| 2,607,047 | 8/1952 | Posey | 5/1 |
| 4,258,516 | 3/1981 | Mori et al. | 52/167 |

FOREIGN PATENT DOCUMENTS 810315  5/1951  Fed. Rep. of Germany ........ 411/72

Primary Examiner—Alexander Grosz
Assistant Examiner—Vinh Luong
Attorney, Agent, or Firm—Wendell Coffee

[57] ABSTRACT

A sturdily constructed shelter bed anchored to a floor provides shelter for persons during tornados or hurricanes in a shelter space protected by steel plates below a mattress and springs. The mattress and springs rest on a horizontal steel plate deck supported above the floor by vertical steel plate skirts welded to the deck. The skirts, the deck and a vertical steel plate door, in combination with the floor, enclose the shelter space. The door horizontally opens to uncover an access opening to the shelter space between the deck and the floor along the bed side. The bed is secured to the floor at anchor plates welded to the skirts. For concrete floors, the anchor plates are bolted to expanding concrete anchors fixed in the concrete. For wood floors, the anchor plates are bolted to anchor beams extending beneath the floor joists. With wood floors, a steel floor plate is fixed to the bed to protect occupants if the wood floor should fail. The shelter space is easily entered by sliding the door away from the access opening, rolling from the bed to a prone position behind the door, and rolling or sliding sidewise under the deck while pulling the door closed.

11 Claims, 7 Drawing Figures

SHELTER BED

CROSS REFERENCE TO RELATED APPLICATIONS

None, however, applicant filed Disclosure Document No. 109,064 on June 18, 1982, which document concerns this application; therefore, by separate paper it is respectfully requested that the document be retained and acknowledgement thereof made by the Examiner.

BACKGROUND OF THE INVENTION (1) Field of the Invention

This invention relates to beds, and more particularly to beds used for shelter.

(2) Description of the Prior Art

Prior to my invention, persons sheltering themselves from tornados or hurricanes sought refuge in storm cellars or somewhat protected areas within the home, such as in interior hallways, or closets, or under heavy pieces of furniture.

Those seeking shelter in outside storm cellars subjected themselves to injury from high winds and wind-blown material or projectiles while running in the open from the house to the outside storm cellar.

Even within somewhat protected areas of homes without storm cellars, the occupants were still faced with the likelihood of bodily injury from windblown missiles, or from falling objects loosened from the walls, ceilings or other parts of the house. If the roof was blown off, or if other substantial structural damage to the house occurred, persons in somewhat protected areas risked a substantial likelihood of injury or death because such partial shelter afforded insufficient protection.

Before this application was filed, a search was made in the U.S. Patent and Trademark Office. That search developed the following U.S. patents:

Hunter, U.S. Pat. No. 36,781
Posey, U.S. Pat. No. 2,607,047.

Posey shows a device for use as a bed and bomb or earthquake shelter. POSEY'S bed is not anchored to the floor to immobilize it, which is essential for tornado shelters.

SUMMARY OF THE INVENTION (1) New Function and Surprising Results

I have invented a bed that substantially enhances the chances of surviving a tornado or hurricane emergency. My invention provides a shelter space enclosed by a horizontal deck, vertical skirts, a vertical door below the deck, and the floor of the building. The deck, skirts and door are preferably constructed of quarter-inch steel plate for strength and rigidity. The springs and mattress of the bed rest on the deck. The door is along one of the long sides of the bed.

The skirts, deck, and door protect occupants of the shelter space from wind propelled missiles and from objects falling from ceilings or walls. The bed is securely anchored to the floor at the anchor plates such that it will remain immobile despite the wind forces incident to a tornado or hurricane.

Anchor plates are attached to the skirts, or to legs rigidly attached to the deck. The bed is anchored to a concrete floor by bolting the anchor plates to large capacity concrete anchors fixed within the concrete. The bed frame is anchored to a wooden floor by rigidly connecting the anchor plates to anchor beams extending below the floor joists. For wooden floors, a horizontal plate, preferably of quarter-inch steel, on the floor is fastened to the bed to protect the occupants of the shelter space from injury by splintering, breaking, or other structural failure of the wooden floor.

The bed door according to my invention, extends about the length of one of the bed sides. The door is slidably mounted to the skirts for horizontal movement, so that when opened, a somewhat protected area in front of the access opening to the shelter space is created. A person entering the shelter space simply lies prone in front of the access opening behind the door and then pulls the door shut behind him as he slides or rolls into the shelter space. The door has a catch thereon to keep it in the closed position. My invention will also shelter persons from the forces of hurricanes, although in such applications, the floor should be above potential flood levels.

Thus, I have invented a device that combines individual elements, such as steel plates, anchors, bolts, beams, etc., to achieve the unusual and surprising results of a structure that can be used as a bed and provide a safe, secure, accessible tornado shelter. The total function and results achieved by my combination far exceeds the sum of the functions of the individual elements such as steel plates, mattress, springs, anchors, bolts, etc.

(2) Objects of this Invention

An object of this invention is to provide a place for persons to sleep and to provide shelter from tornados and hurricanes.

Further objects are to achieve the above with a device that is sturdy, compact, durable, simple, safe, efficient, versatile, ecologically compatible, energy conserving, and reliable, yet inexpensive and easy to manufacture, install, and maintain.

The specific nature of the invention, as well as other objects, uses, and advantages thereof, will clearly appear from the following description and from the accompanying drawing, the different views of which are not necessarily scale drawings.

DESCRIPTION OF THE PREFERRED EMBODIMENT

Figure 1:
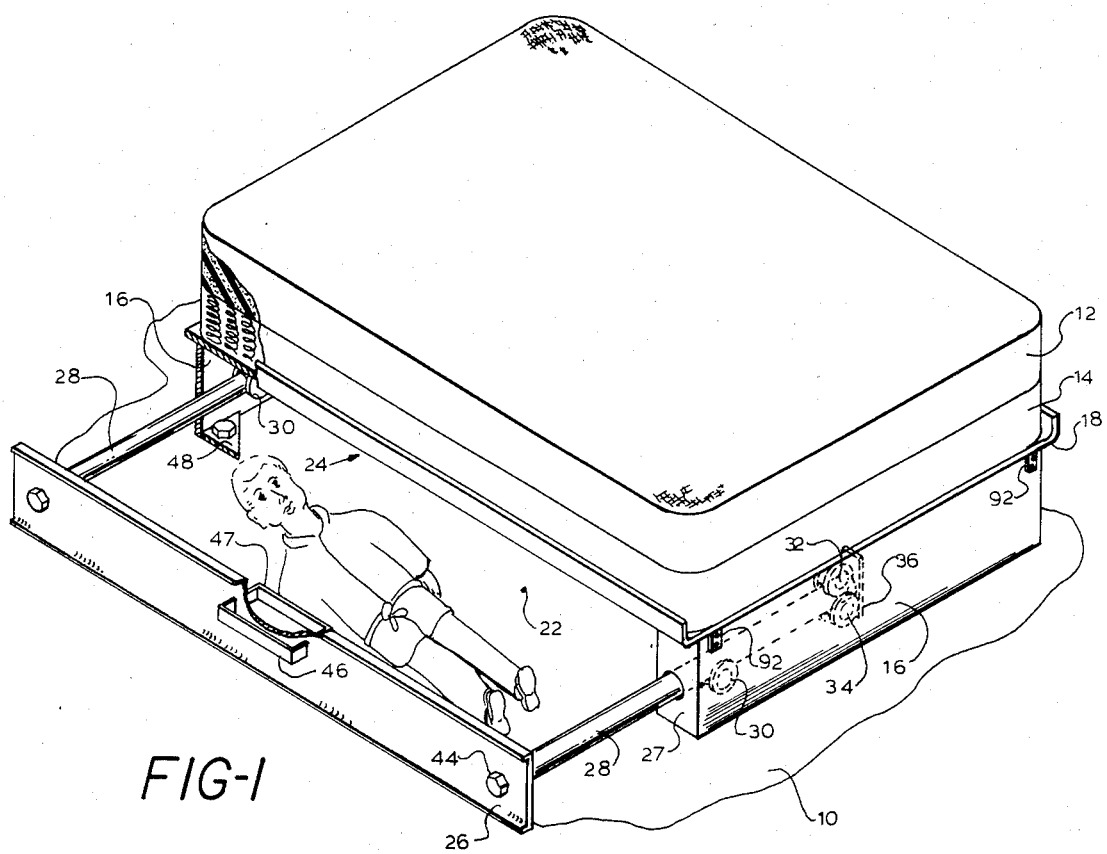
FIG. 1 is a perspective view of a shelter bed according to my invention having legs integral with the skirts, with parts broken away to show detail.

A shelter bed according to my invention as shown in FIG. 1 rests upon floor 10, and includes mattress 12 supported by springs 14 on a bed frame. The shelter bed has two bed ends, and two bed sides that are usually longer than the bed ends.

The bed frame includes vertical steel end plates or skirts 16 having bottom edges on the floor 10 and top edges welded to horizontal steel plate deck 18 at the bed ends. The two end skirts 16 form legs integral therewith for supporting the deck 18 above the floor 10. The bed frame also includes vertical steel side plates or skirt 20 having a top edge welded to the deck 18 along one of the bed sides. When a bottom edge of the side skirt 20 is on the floor, the legs are also integral with the side skirt.

I prefer to construct the deck 18 and the skirts 16 and 20 of quarter-inch steel plate. I also prefer to form the side skirt 20 and the end skirts 16 by bending a single piece of steel plate to reduce the number of welds required during assembly and to increase the structural integrity of the bed frame.

Access opening 22 extends substantially the length of the bed side opposite the side skirt 20. The access opening 22 provides access to shelter space 24 below the deck 18, mattress 12, and springs 14. The shelter space 24 is enclosed by the skirts 16 and 20, the deck 18, the floor 10, and the access opening 22.

The deck 18 is preferably 12 inches above the floor 10. The deck 18 may be spaced as much as 18 inches above the floor. The deck 18 is sized to accommodate the desired standard mattress size. The skirts 16 and 20 are preferably sized to enclose an area slightly less than the dimensions of the deck 18. The shelter space 24 below the deck 18 is of sufficient dimensions to accommodate at least one person for a single bed, and two or more persons for double, queen or king size beds.

More than one set of springs or mattresses may be employed, such as with king size or queen size beds. Additionally, the deck 18 provides excellent firm support for those with back problems with only mattress 12 thereon, without the springs 14. The bed frame is also suitable support for a waterbed mattress.

Although the shelter space 24 as described above provides adequate protection from tornadic forces, and flying missiles, the shelter beds safety from missiles may be augmented by vertical steel plate door 26 attached, or slidably mounted, for horizontal movement to the end skirts 16. The door 26 is also preferably constructed of quarter-inch steel plate and extends over the access opening 22. The ends of the end skirts 16 adjacent the access opening 22 are bent to form corners for structural strength, and provide facings 27 for the door 26.

Figure 2:
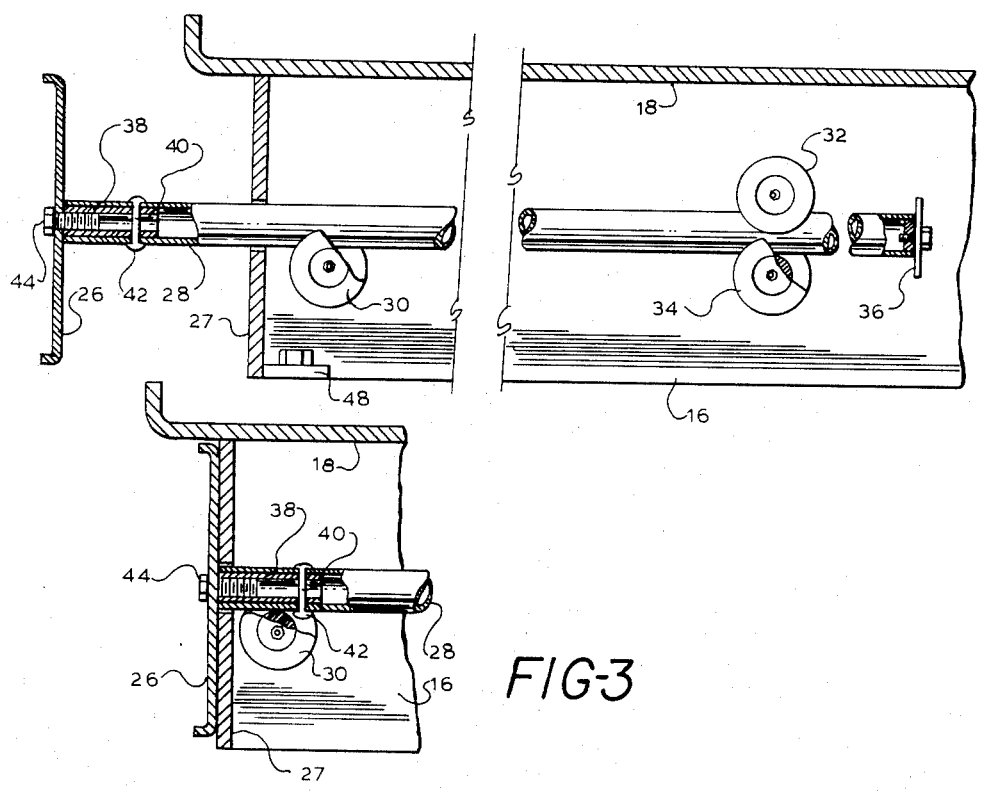
FIG. 2 is a partial sectional view of the bed showing the door mounting, with the door partially open.
Figure 3:
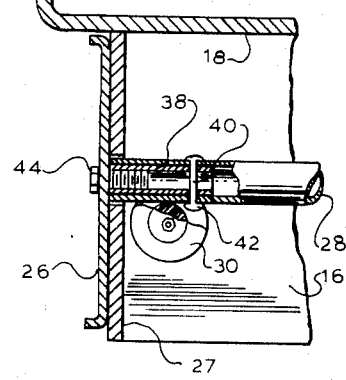
FIG. 3 is a partial sectional view of the bed as shown in FIG. 2 with the door closed.

Referring to FIGS. 2 and 3, the door mounting includes hollow rods 28 perpendicularly attached at each end of the door 26. The rods 28 slide on front rollers 30, and between top and bottom rear rollers 32 and 34, respectively. The rollers 30 are journaled to the end skirts 16 within the shelter space 24 adjacent the access opening 22. The rear rollers 32 and 34 are journaled mediate the end skirts in vertical alignment within the shelter space.

Stops 36 at the end of the rods 28 prevent withdrawal of the rods 28 from between the rear rolleras 32 and 34. Because the door is somewhat heavy, the rollers are required to facilitate its opening and closing during panicky emergency situations. The stop 36 is removable to permit withdrawal of the door for installation, removal or repair.

The rods 28 are connected to the door 26 by inserts 38 telescoped into the ends of the hollow rods 28 and secured therein by pins 40 extending through the rods and inserts. The lower ends of the pins 40 extend below the rods 28 to form studs or bumps 42. Door bolts 44 are inserted through holes in the door 26 and screwed into the inserts 38 to secure the door thereto.

When the door 26 is open, the bumps 42 are in front of the rollers 30 from the access opening (FIG. 2). As the door is rolled closed, the bumps will contact the front rollers. As force is exerted to close the door, the bumps 42 will be forced over the front rollers 30. When the bumps are behind the rollers 30 from the access opening (FIG. 3), they will prevent opening of the door until the required force is exerted to push the bumps over the rollers 30. The bumps 42 form catches for securing the door in a closed position. These bumps are preferable catches to mechanical types such as bolts, slides, or other types of mechanical latches, because the disengagement of such latches may consume the precious seconds needed to safely secure one's person within the shelter space 24 during an emergency. Also there is no likelihood of the bumps being jammed by a frantic person, as is the case with bolts or slides.

The door 26 has outer handle 46 attached on the outside, and inner handle 47 attached on the inside, thereof. I prefer to reinforce the door 26 by bending the top and bottom edges thereof at 90° angles to increase the structural strength of the door. The deck 18 is likewise reinforced by bending the side edges upward as shown in the drawing. The vertical bends of the deck 18 also aid in securing the mattress 12 and springs 14 thereon.

Anchor plates 48 are welded horizontal across the four corners between the bottom edges of the skirts. The anchor plates provide a convenient point on the bed at which to attach anchor means for fixing the bed to the floor 10.

Figure 4:
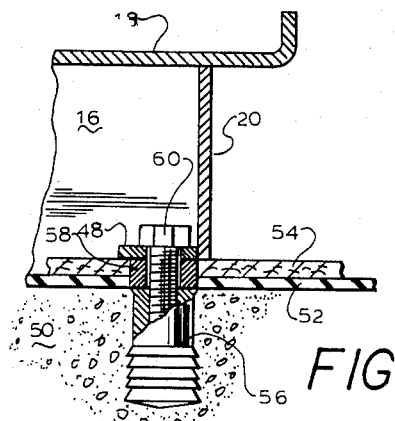
FIG. 4 is a partial sectional view of an anchor structure for a concrete floor.
Figure 5:
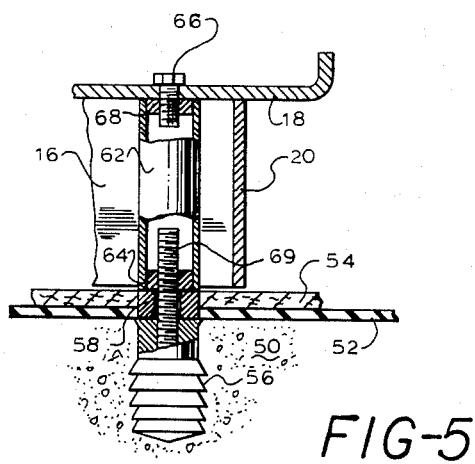
FIG. 5 is a partial sectional view of another embodiment of a shelter bed having legs separate from the skirts, anchored to a concrete floor.

Referring to FIGS. 4 and 5, a typical bedroom floor made of concrete includes concrete subfloor 50, carpet pad 52 over the concrete subfloor, and carpet 54 over the carpet pad. High capacity concrete anchors 56 are wedged and set in the subfloor 50 below the anchor plates 48 at all four corners of the bed. To accomplish this, holes are drilled in the concrete subfloor, and the concrete anchors 56 inserted therein. I prefer to use the steel flange, multiset, drop-in anchors shown in the drawing, because of ease of installation. However, it will be understood that other concrete anchors may be employed to anchor the bed to the floor. The primary requisite of an anchor is that it is of sufficient capacity to maintain the bed securely fixed to the floor despite the strong forces generated by tornados.

After the anchors 56 are securely fixed within the subfloor 50, steel washers or spacers 58 are inserted in holes cut through the carpet pad 52 and carpet 54 above the anchors 56. The bed is then positioned over the anchors and spacers with holes in the anchor plates 48 aligned therewith. Anchor bolts 60 are then screwed into the anchors 56 through the spacers 58 and anchor plates 48 to bolt the bed to the subfloor 56. The bolts 60, anchor plates 48, spacers 58, and anchors 56 form anchor means for fixing or rigidly attaching the bed to the concrete subfloor 50.

The spacers 58 are selected to be the thickness of the carpet 54 and pad 52. It will be understood that the shelter bed may be anchored without the spacers 58. However, if the spacers are not employed, the bed is preferably located directly on the concrete subfloor 50 to remove any play or flexing of the bed with respect to the anchor 56. Use of the spacers 58 insures that the bed is rigidly fixed to the anchors 56 with metal on metal contact.

FIG. 5 shows an embodiment of my invention with the legs not integral with the skirts. Steel pipe legs 62 are attached to the deck 18. The skirts 16 and 20 are preferably welded to the deck 18. Anchor plates 64 are welded in the bottoms of the legs 62. The legs 62 are attached to the deck 18 with leg bolts 66 through holes in the deck 18 screwed into leg plates 68 welded in the tops of the legs 72. For this embodiment, the skirts 16 and 20 preferably extend almost to the carpet 54. The bed is anchored with anchor bolts 69 screwed through threaded holes in the anchor plates 64 in the same manner as for the anchor plates 48 shown in FIGS. 4 and 6.

A shelter bed having the legs 62 attached to the deck 18 does not necessarily require the skirts or door on all four sides to provide adequate protection from a tornado. A bed located in a room with windows in only one wall would preferably have a skirt attached to the bed along the bed side facing the window to protect from flying missiles from the window. However, it will be understood that a bed having skirts and a door provides increased protection and peace of mind.

Figure 7:
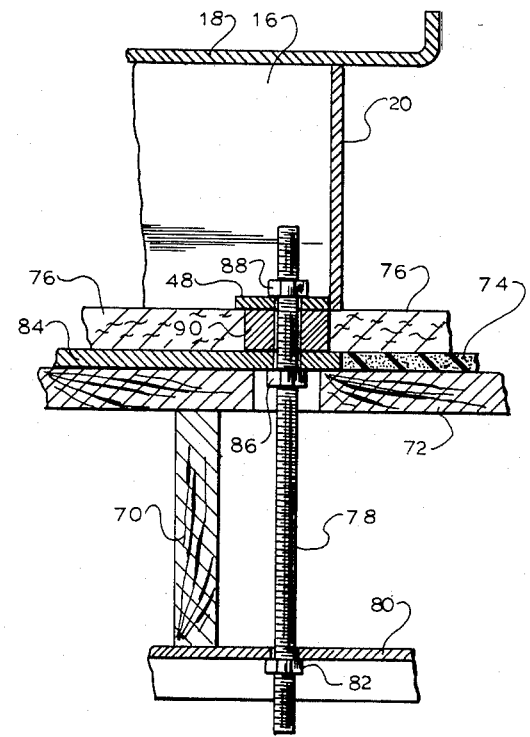
FIG. 7 is a partial sectional view of the bed shown in FIG. 6, enlarged to show detail.
Figure 6:
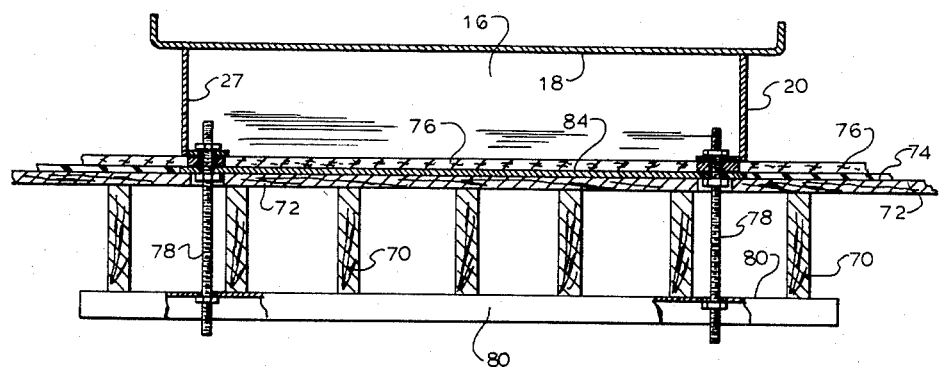
FIG. 6 is a sectional view of yet another embodiment, of the bed anchored to a wood floor (with door mounting not shown for clarity).

FIGS. 6 and 7 show sectional views of the bed having legs integral with the skirts anchored to a wooden floor, with the door and door mountings omitted for clarity. A typical bedroom floor may be seen to include wood floor joists 70 spaced apart beneath wood subfloor 72 attached thereto. Carpet pad 74 with carpet 76 thereon covers the wood subfloor 72.

Threaded anchor rods 78 inserted through holes in the anchor plates 48, the carpet 76, the carpet pad 74, and the subfloor 72 between the joists 70. The anchor rods 78 extend below the joists 70. Anchor beams 80 are connected to the anchor rods 78 by inserting the anchor rods through holes in the anchor beams 80 and threading beam nuts 82 onto the anchor rods 78 below the anchor beams 80. The anchor beams 80 span several joists 70.

Floor plate 84 is positioned within a large cutout or hole in the carpet pad 74. The floor plate 84 is substantially coextensive with the floor area below the shelter space 24. Holes at the corners of the floor plate 84 are aligned with the holes in the anchor plates 48. The carpet 76 extends over the floor plate 84.

Floor nuts 86 are threaded onto the anchor rods 78 below the floor plate 84 and within holes cut in the wooden subfloor 72. Anchor nuts 88 are threaded onto the anchor rod 78 above the anchor plates 48. Spacers 90 sized to the thickness of the carpet 76 are positioned between the floor plate 84 and the anchor plate 48, with the anchor rods 78 extending through aligned holes therein.

The anchor nuts 88, floor nuts 86, and beam nuts 82 are all tightened so that the floor plate 84 is snugly secured to the bed at the anchor plates 48 and so that the anchor beams 80 snugly press the joists 70, the wooden subfloor 72, the steel floor plate 84, and the spacers 90 between the bed at the anchor plates 48 and the anchor beams 80.

Although not shown in the drawing, another anchor beam 80 would be secured to the two anchor plates 48 at the other corners of the bed. The anchor rods 78, floor nuts 86, and anchor nuts 88 from bolting means for rigidly connecting the floor plate to the anchor plates, and thereby connecting the floor plate to the bed. The anchor rods 78, beam nuts 82, and anchor nuts 88 from bolting means for rigidly connecting the anchor beams 80 to the anchor plates 48, thereby connecting the anchor beams to the bed. The anchor beams 80, anchor rods 78, spacers 90, floor plate 84, beam nuts 82, floor nuts 86, anchor plates 48, and anchor nuts 88, form anchor means for fixing or rigidly attaching the bed to the wood subfloor 72.

The advantages of this anchor system should be apparent. The bed is anchored, not to the floor boards, which could pull loose during the application of tornadic forces, but to the floor joists secured to the house foundation. Additionally, the forces applied to the bed are distributed across the several joists 70 beneath the bed.

Even if the joists should pull loose and the bed become dislodged, the steel floor plate 84 is securely attached to the bed, forming a shelter space protected on all sides by plate steel. Therefore, splintering, cracking or pulling loose of boards in the wood subfloor 72 will not cause injury to persons occupying the shelter space below the deck 18. It will be understood that if there is no floor covering on the wood subfloor 72, the spacers 90 will not be used, such that the anchor plates 48 abut the floor plate 84.

Referring to FIG. 1, I prefer to weld brackets 92 to the deck 18 at each bed end as a convenient mounting plate for conventional headboards and footboards, if desired.

The bed is used during a tornado or alert as follows: When a tornado alarm is given, or when a tornado is sighted, especially at night in bed, the person on the bed side nearest the door 26 reaches down, grasps the outer handle 46, and pulls the door open by rolling the bumps 42 over the front rollers 30. The door then easily slides horizontally away from the access opening 22. The persons occupying the bed, and other family members, may then (or later) lie prone behind the door 26 in front of the opening 22, and slide or roll within the shelter space 24. As the last family member to enter the shelter space rolls beneath the deck, he grasps the inner handle 47 and pulls the door shut behind him, rolling the bumps 42 over the front rollers 30, thereby latching or catching the door in the closed position. After the tornado passes or the emergency ceases, the door may then be pushed open.

As stated before, the bed offers adequate tornado shelter without a door. Studies of tornado damage show almost no missiles penetrate interior walls. Therefore, if any opening were facing an interior wall, then a person under the deck would be protected from falling objects and not in danger of injury from a missile. Of course, greater shelter is provided with a door.

The door has been shown as a sliding door. Obviously a single door could be hinged at one corner of the bed so that it would move about a vertical axis at the corner of the bed. Other type door hangings or movement or closures could also be provided. In summary, the bed could be made with no door, a sliding door, or a hinge swinging door.

Also, there could be different embodiments as to the exact method that the floor covering is cut out or placed.

The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | floor | 52 | carpet pad |
|----|-------|----|------------|
| 12 | mattress | 54 | carpet |
| 14 | springs | 56 | concrete anchors |
| 16 | end skirts | 58 | spacers |
| 18 | deck | 60 | anchor bolts |
| 20 | side skirt | 62 | legs |
| 22 | access opening | 64 | anchor plates |
| 24 | shelter space | 66 | leg bolts |
| 26 | door | 68 | leg plates |
| 27 | facings | 69 | anchor bolts |
| 28 | rods | 70 | floor joists |
| 30 | front rollers | 72 | wood subfloor |
| 32 | top rear roller | 74 | carpet pad |
| 34 | bottom rear rollers | 76 | carpet |
| 36 | stops | 78 | anchor rods |
| 38 | inserts | 80 | anchor beams |
| 40 | pins | 82 | beam nuts |
| 42 | bumps | 84 | floor plate |
| 44 | door bolts | 86 | floor nuts |
| 46 | outer handle | 88 | anchor nuts |
| 47 | inner handle | 90 | spacers |
| 48 | anchor plates | 92 | brackets |
| 50 | concrete subfloor | | |

I claim as my invention:

1. A bed having
   (a) a rigid, rectangular, horizontal deck supported above a floor by
   (b) legs on the floor that are attached to the deck, thus forming
   (c) a shelter space below the deck for at least one person,
   (d) two bed ends,
   (e) two bed sides having a length,
   (f) at least one mattress on the deck;
   wherein the improvement comprises:
   (g) two rigid, vertical end skirts on the floor at the bed ends attached to the deck,
   (h) at least one rigid, vertical side skirt along the bed sides,
   (j) the legs being integral with at least two of the skirts,
   (k) at least one access opening between the deck and the floor substantially the length of the bed sides, and
   (l) anchor means for rigidly attaching the bed to the floor,
   (m) said floor including
      (i) a plurality of spaced-apart joists, and
      (ii) a wood subfloor on top of and attached to the joists,
   (n) said anchor means including
      (i) a rectangular, rigid floor plate between the wood subfloor and the bed that is substantially coextensive with the floor area of the shelter space,
      (ii) anchor plates attached to the bed above the floor plate,
      (iii) anchor beams below and extending across the spaced-apart joists below the bed,
      (iv) bolting means for rigidly connecting
         (a) the floor plate to the anchor plates, and
         (b) the anchor beams to the anchor plates.

2. The invention as defined in claim 1 including all of the limitations (a) through (n) with the addition of the following limitations:
   (o) aligned holes in the anchor beams, wooden subfloor, floor plate, and anchor plates,
   (p) threaded anchor rods telescoped through the aligned holes,
   (q) a beam nut threaded onto the anchor rod below the anchor beam,
   (r) floor nuts threaded onto the anchor rod below the floor plate,
   (s) bed nuts threaded onto the anchor rod above the anchor plates,
   (t) the holes within the wooden subfloors being larger than the floor nuts,
   (u) the floor nuts and the bed nuts being threadably adjusted on the anchor rod to form said bolting means for rigidly connecting the floor plate to the bed, and
   (v) the beam nuts and the bed nuts being threadably adjusted on the anchor rod to form said bolting means for rigidly connecting the anchor beams to the bed.

3. The invention as defined in claim 1 including all of the limitations (a) through (n) with the addition of the following limitations:
   (o) said floor including a floor covering over the wooden subfloor,
   (p) the floor plate being within a large cutout in the floor covering.

4. The invention as defined in claim 1 including all of the limitations (a) through (n) with the addition of the following limitations:
   (o) said floor including
      (i) a pad covering the wooden subfloor, and
      (ii) a carpet covering the pad,
   (p) the floor plate being within a large rectangular cutout in the pad,
   (q) the carpet substantially covering the floor plate, and
   (r) spacers the thickness of the carpet telescoped over the anchor rods within holes in the carpet between the anchor plates and the floor plate.

5. A bed having
   (a) a rigid, rectangular, horizontal deck supported above a floor by
   (b) legs on the floor that are attached to the deck, thus forming
   (c) a shelter space below the deck for at least one person,
   (d) two bed ends,
   (e) two bed sides that are longer than the bed ends,
   (f) at least one mattress on the deck;
   wherein the improvement comprises:
   (g) the deck being a steel plate,
   (h) two vertical steel plate end skirts having bottom edges on the floor at the bed ends and welded along top edges of the end skirts to the deck,
   (j) at least one rigid vertical steel plate side skirt along the bed side connected to the bed,
   (k) the legs being integral with the end plates,
   (l) at least one access opening between the deck and the floor substantially the length of the bed side,
   (m) at least one of the side skirts being a vertical steel plate door movably mounted on the end plate so that
      (i) the door substantially covers the access opening when closed, and (ii) the door exposes the access opening sufficiently for a person to enter the shelter space when the door is open,
(n) the door extending substantially the length of the access opening,
(o) a catch on the door for securing it in the closed position, and
(p) anchor means for rigidly attaching the bed to the floor,
(q) said floor including
  (i) a concrete subfloor,
  (ii) a floor covering over the concrete subfloor,
(r) said anchor means including
  (i) inside-threaded concrete anchors fixed within the concrete subfloor, and aligned with
  (ii) horizontal anchor plates welded to the bottom of the end plates,
  (iii) anchor bolts rigid attaching the anchor plates to the concrete anchors,
(s) rigid spacers the thickness of the floor covering telescoped within the holes in the floor covering over the anchor bolts between the anchor plates and the concrete anchors.

6. A bed having
(a) a rigid, rectangular, horizontal deck supported above a floor by
(b) legs on the floor that are attached to the deck, thus forming
(c) a shelter space below the deck for at least one person,
(d) two bed ends,
(e) two bed sides that are longer than the bed ends,
(f) at least one mattress on the deck;
wherein the improvement comprises:
(g) the deck being a steel plate,
(h) two vertical steel plate end skirts having bottom edges on the floor at the bed ends and welded along top edges of the end skirts to the deck,
(j) at least one rigid vertical steel plate side skirt along the bed side connected to the bed,
(k) the legs being integral with the end plates,
(l) at least one access opening between the deck and the floor substantially the length of the bed side,
(m) at least one of the side skirts being a vertical steel plate door movably mounted on the end plate so that
  (i) the door substantially covers the access opening when closed, and
  (ii) the door exposes the access opening sufficiently for a person to enter the shelter space when the door is open,
(n) the door extending substantially the length of the access opening,
(o) a catch on the door for securing it in the closed position, and
(p) anchor means for rigidly attaching the bed to the floor,
(q) said floor including
  (i) a plurality of spaced-apart joists, and
  (ii) a wood subfloor on top of and attached to the joists,
  (iii) a pad covering the wood subfloor, and
  (iv) a carpet covering the pad,
(r) said anchor means including
  (i) a rectangular, rigid floor plate within a large rectangular cutout in the pad between the wood subfloor and the bed that is substantially coextensive with the shelter space,
  (ii) the carpet substantially covering the floor plate,
  (iii) anchor plates welded to the bottoms of the end plates;
  (iv) anchor beams below and extending across the spaced-apart joists below the bed,
  (v) spacers within holes in the carpet between the anchor plates and the floor plate,
  (vi) aligned holes in the anchor beams, wooden subfloor, floor plate, spacers and anchor plates,
  (vii) threaded anchor rods telescoped through the aligned holes,
  (viii) beam nuts threaded onto the anchor rod below the anchor beam,
  (ix) floor nuts threaded onto the anchor rod below the floor plate,
  (x) bed nuts threaded onto the anchor rod above the anchor plates
  (xi) the holes within the wooden subfloors being larger than the floor nuts,
  (xii) the floor nuts and the bed nuts being threadably adjusted on the anchor rod rigidly attached the floor plate to the bed, and
  (xiii) the beam nuts and the bed nuts being threadable adjusted on the anchor rod to rigidly attach the anchor beams to the bed.

7. A bed having
(a) a rigid, rectangular, horizontal deck supported above a floor by
(b) legs on the floor that are attached to the deck, thus forming
(c) a shelter space below the deck for at least one person,
(d) two bed ends,
(e) two bed sides that are longer than the bed ends,
(f) at least one mattress on the deck;
wherein the improvement comprises:
(g) the deck being a steel plate,
(h) two vertical steel plate end skirts having bottom edges on the floor at the bed ends and welded along top edges of the end skirts to the deck,
(j) at least one rigid vertical steel plate side skirt along the bed side connected to the bed,
(k) the legs being integral with the end plates,
(l) at least one access opening between the deck and the floor substantially the length of the bed side,
(m) at least one of the side skirts being a vertical steel plate door movably mounted on the end plate so that
  (i) the door substantially covers the access opening when closed, and
  (ii) the door exposes the access opening sufficiently for a person to enter the shelter space when the door is open,
(n) the door extending substantially the length of the access opening,
(o) a catch on the door for securing it in the closed position, and
(p) anchor means for rigidly attaching the bed to the floor,
(q) said door mounting including
  (i) front guide rollers journaled to the end skirts proximate the access opening,
  (ii) vertically aligned pairs of back guide rollers journaled to the end skirts mediate thereof,
  (iii) slide rods attached normal to the door and resting on the front roller and extending between the back rollers, and (iv) stops on the slide rods to limit extension of the door,
(r) said catch including bumps positioned on the undersides of the slide rods such that
  (i) when the door is closed, the bumps are behind the front rollers from the access opening, and
  (ii) when the door is open, the bumps are in front of the front rollers from the access opening.

8. A bed having
(a) a rigid, rectangular, horizontal plate deck supported above a floor by
(b) legs on the floor that are attached to the deck, transforming
(c) a shelter space below the deck for at least one person,
(d) two bed ends,
(e) two bed sides, and
(f) at least one mattress on the deck,
wherein the improvement comprises:
(g) concrete anchor structure for rigidly attaching the bed to a concrete subfloor of the floor,
(h) at least two rigid, vertical skirts connected along a bed end and a bed side between the deck and the floor,
(j) an access opening between the deck and the floor substantially the length of the bed side,
(k) at least one skirt being a rigid door moveably mounted on the bed so that
  (i) the door substantially covers the access opening when closed, and
  (ii) the door exposes the access opening sufficiently for a person to enter the shelter space when the door is open,
(l) said deck and skirt being made of steel plate.

9. A bed having
(a) a rigid, rectangular, horizontal deck supported above a floor by
(b) legs on the floor that are attached to the deck, thus forming
(c) a shelter space below the deck for at least one person,
(d) two bed ends,
(e) two bed sides having a length,
(f) at least one mattress on the deck;
wherein the improvement comprises:
(g) two rigid, vertical end skirts on the floor at the bed ends attached to the deck,
(h) at least one rigid, vertical side skirt along the bed sides,
(j) the legs being integral with the end skirts,
(k) at least one access opening between the deck and the floor substantially the length of the bed side,
(l) concrete anchor structure for rigidly attaching the end skirts to a concrete subfloor of the floor,
(m) said deck and skirts being made of steel plates,
(n) at least one of the side skirts being a rigid door movably mounted on the bed so that
  (i) the door substantially covers the access opening when closed,
  (ii) the door exposes the access opening sufficiently for a person to enter the shelter space when open,
(o) a catch on the door for securing it in the closed position, and
(p) said deck being at least about 12 inches above the floor.

10. The invention as defined in claim 9 including all of the limitations (a) through (p) with the addition of the following limitations:
(q) said floor including a floor covering over the concrete subfloor,
(r) holes in the floor covering over the concrete anchors,
(s) the concrete anchor structure including anchors within the concrete floor and bolts extending above the concrete subfloor,
(t) rigid spacers the thickness of the floor covering telescoped within the holes in the floor covering, around the bolts between the end skirts and the anchors.

11. A bed having
(a) a rigid, rectangular, horizontal deck supported above a floor by
(b) legs on the floor that are attached to the deck, thus forming
(c) a shelter space below the deck for at least one person,
(d) two bed ends,
(e) two bed sides that are longer than the bed ends,
(f) at least one mattress on the deck;
wherein the improvement comprises:
(g) the deck being a steel plate,
(h) two vertical steel plate end skirts having bottom edges on the floor at the bed ends and welded along top edges of the end skirts to the deck,
(j) at least one rigid vertical steel plate side skirt mounted to the bed along the bed sides,
(k) the legs being integral with the end skirts,
(l) at least one access opening between the deck and the floor substantially the length of the bed sides,
(m) at least one of the side skirts being a door movably mounted to at least one end plate so that
  (i) the door substantially covers the access opening when closed, and
  (ii) the door exposes the access opening sufficiently for a person to enter the shelter space when open,
(n) a catch on the door for securing it in the closed position,
(o) said floor including a floor covering over a concrete subfloor,
(p) holes in the floor covering below the end skirts,
(q) rigid spacers the thickness of the floor covering telescoped within the holes in the floor covering,
(r) concrete anchors in the concrete subfloor, having anchor bolts telescoped through holes in the spacers, rigidly attaching the end skirts to the concrete subfloor with the spacers sandwiched between the concrete subfloor and the end skirts, and
(s) said deck being about 12 inches above the floor.

* * * * *